Oct. 11, 1938.  E. G. LANTZ  2,133,202
TRAILER HITCH
Filed April 7, 1937
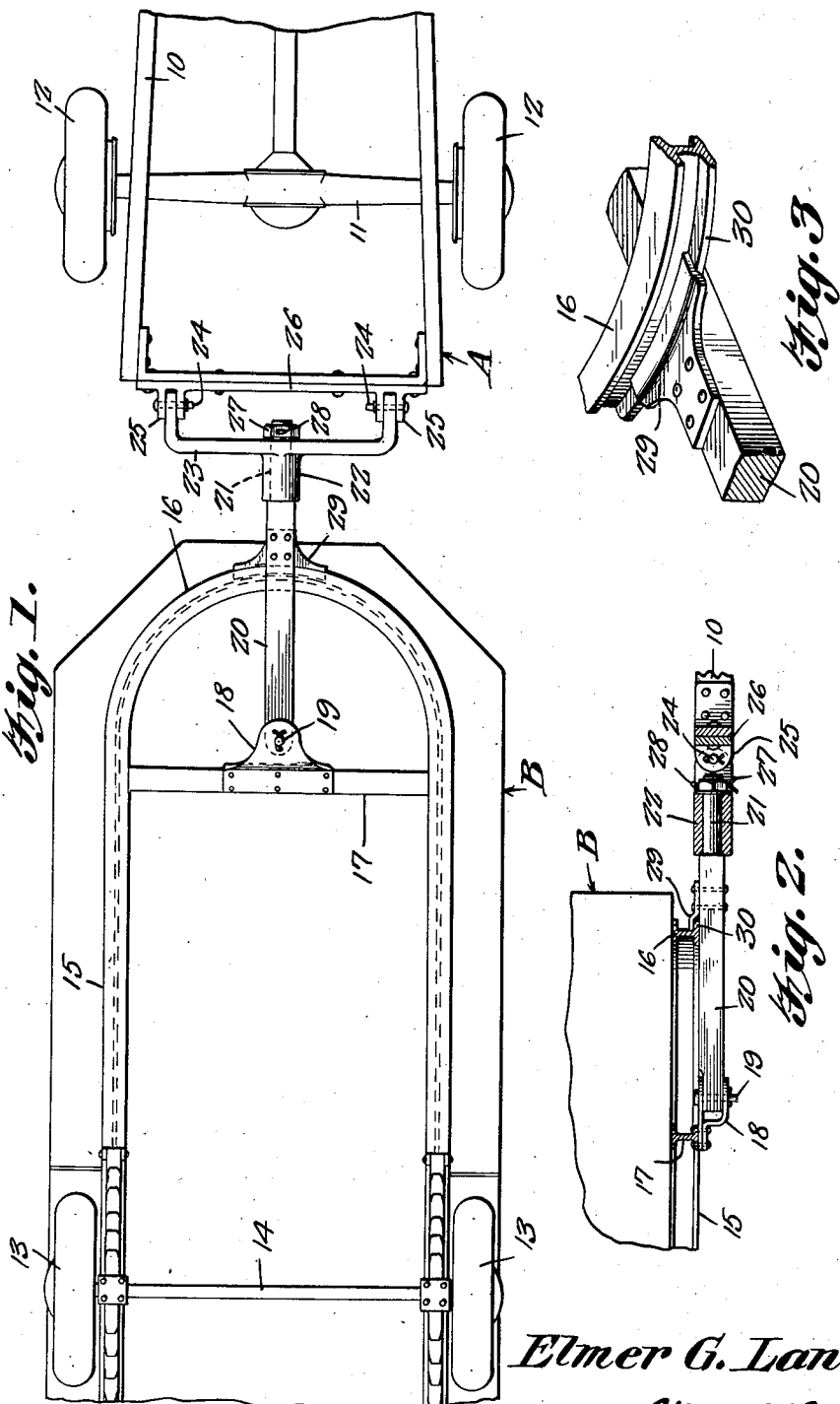
Elmer G. Lantz,
INVENTOR Patented Oct. 11, 1938

2,133,202

UNITED STATES PATENT OFFICE 2,133,202

TRAILER HITCH

Elmer G. Lantz, Salem, Oreg.

Application April 7, 1937, Serial No. 135,594

1 Claim. (Cl. 280—33.44)

The invention relates to a hitch and more especially to a trailer hitch.

The primary object of the invention is the provision of a hitch of this character, wherein a draft vehicle is coupled with a trailing vehicle so that the tracking of the rear wheels of said trailing vehicle will follow in the tracking of the rear wheels of the draft vehicle and at the same time all strains or twists will be prevented from transmission to either vehicle as set up by one of the same.

Another object of the invention is the provision of a hitch of this character, wherein smooth operation of the same is assured and a positive coupling had between a draft and a trailing vehicle.

A further object of the invention is the provision of a hitch of this character, which is extremely simple in its construction, thoroughly reliable and effective in operation, possessing but few parts yet strong, durable, and inexpensive to manufacture and install.

With these and other objects in view, the invention consists in the features of construction, combination and arrangement of parts as will be hereinafter more fully described, illustrated in the accompanying drawing, which discloses the preferred embodiment of the invention and pointed out in the claim hereunto appended.

In the accompanying drawing:

Figure 1 is a fragmentary bottom plan view of draft and trailing vehicles showing the hitch constructed in accordance with the invention applied.

Figure 2 is a fragmentary vertical longitudinal sectional view through the hitch.

Figure 3 is a fragmentary perspective view of adjuncts of the hitch.

Similar reference characters indicate corresponding parts throughout the several views in the drawing.

Referring to the drawing in detail, A designates generally a portion of a draft vehicle of the motivated type, a portion of its chassis being indicated at 10, the rear axle at 11 and the rear traction wheels at 12, respectively, while B designates a portion of a trailing vehicle. This vehicle B has the traction wheels 13 supported by an axle 14. The chassis 15 of the vehicle B is formed forwardly thereof with a half circular track 16 constituting a fifth wheel and such is preferably of I formation while between the sides of the chassis 15 rearwardly of the track 16 is a cross member or bar 17 having fixed thereto at the longitudinal median of said vehicle B a pivot bracket 18 carrying a pivot 19 which is located at a center point between the axles 11 and 14 of both vehicles. This pivot 19 has swingingly connected thereto a draw bar 20 formed with a pintle end 21 swiveled in a sleeve extension 22 on a vertically swinging yoke 23.

The yoke 23 at its ends is pivoted at 24 with pivot ears 25 extending from a bracket or plate 26 fixed transversely to the rear end of the vehicle A. The sleeve extension 22 is located at the longitudinal center of the vehicle A and the pintle end 21 has threaded thereon a nut 27 detachably connecting the said pintle end in the sleeve extension 22 and such nut is locked by a cotter pin 28.

The draw bar 20 carries a slide shoe 29 overlapping a flange 30 of the track 16. It will be apparent from Figure 1 of the drawing that by reason of the pivotal mounting 19 of the draw bar 20 at a point centrally between the axles 11 and 14 of the vehicles A and B that the rear vehicle wheels 13 will track at all times with the rear wheels 12 of the vehicle A when the draft vehicle A is making a turn and by reason of the yoke 23 and its pivotal coupling with the draw bar 20 avoids strain or twist being submitted from one vehicle to the other when the vehicle A is pulling or drawing the vehicle B.

What is claimed is:

A trailer hitch for draft and trailer vehicles, each having a body and a chassis frame, comprising a horizontally disposed half-circular track formed from an I-shaped beam, the I-shaped beam providing a top and bottom flange fifth wheel, the top flange providing a bearing for the body of one vehicle, a drawbar pivoted centrally with respect to said track for horizontal swinging movement below the same and contacting with the lowermost flange of said beam, a slide shoe fixed to the top of said drawbar and overlapping the bottom flange of said beam for holding the bar slidably connected with the track, a substantially U-shaped yoke pivoted to the other chassis frame for vertical swinging movement, a centrally perforated boss formed on said yoke at the center thereof, a reduced extension fitting said boss and swiveled therein, and a separable coupling for said drawbar and permanently fixed to the chassis frame having the tracks.

ELMER G. LANTZ.